United States Patent

[11] 3,564,157

[72] Inventors Yoshiro Kato; Shigeo Kato, Yokohama, Japan
[21] Appl. No. 664,713
[22] Filed Aug. 31, 1967
[45] Patented Feb. 16, 1971
[73] Assignee Victor Company of Japan, Ltd., Yokohama, Japan
[32] Priority Sept. 1, 1966
[33] Japan
[31] 41/81972

[54] PLAYBACK CHANGE APPARATUS FOR MULTI-TRACK TAPE RECORDER
3 Claims, 4 Drawing Figs.

[52] U.S. Cl. .......... 179/100.2
[51] Int. Cl. .......... G11b15/06, G11b 15/10, G11b 71/08
[50] Field of Search .......... 179/100.2 (MI), 100.2 (Z), 100.2 (S), 100.2 (CA); 274/4 (B), 11 (B)

[56] References Cited

UNITED STATES PATENTS

| | | | |
|---|---|---|---|
| 3,109,898 | 11/1959 | Gray | 179/100.2 |
| 3,427,408 | 2/1969 | Lempert et al. | 179/100.2 |
| 3,437,762 | 4/1969 | Lear et al. | 179/100.2 |

*Primary Examiner*—Bernard Konick
*Assistant Examiner*—Robert S. Tupper
*Attorney*—Stevens, Davis, Miller & Mosher

ABSTRACT: An operation changing apparatus for a tape recorder using multitrack endless tape comprising a circuit for stopping the run of an endless magnetic tape by opening automatically an electric power circuit of a motor for driving said magnetic tape, a circuit for changing and performing each channel of the magnetic tape in order by shifting a magnetic head, and a circuit for driving said motor successively by opening said automatic stopping circuit and said automatic channel changing circuit, wherein any operating state of the tape recorder can be obtained by changing selectively and suitably each said circuit.

INVENTORS
YOSHIRO KATO, SHIGEO KATO,

BY Stevens, Davis, Miller & Mosher
ATTORNEYS

INVENTORS

YOSHIRO KATO, SHIGEO KATO

BY Stevens, Davis, Miller & Mosher

ATTORNEYS

PLAYBACK CHANGE APPARATUS FOR MULTI-TRACK TAPE RECORDER

This invention relates to a device for changing over from one operation to another in a tape recorder using a multitrack endless tape. In particular, the invention relates to a device for selectively switching from one to another of the operations including repeat performance, automatic performance stop and automatic channel switching in a cartridge type tape recorder of the multitrack endless tape.

In a cartridge type tape recorder of the multitrack endless tape it has hitherto been practice to provide an automatic channel switching circuit whereby the magnetic head can be switched from one channel to the next channel as soon as performance on the former has been finished. However, tape recorders of the prior art have had no circuit for repeat performance on the same channel and automatic performance stop upon completion of performance on one channel, so that it has been impossible to selectively change over from one to another of the operations referred to hereinabove with tape recorders of the prior art.

The present invention can obviate the disadvantage referred to hereinabove.

An object of the present invention is to provide a device for switching from one operation to another in a tape recorder of the multitrack endless tape type whereby changeover of playback operations can be effected selectively and readily as desired.

Another object of the invention is to provide a device for switching from one operation to another in a tape recorder of the multitrack endless tape type whereby automatic performance stop and automatic channel switching operations can be performed selectively and readily, so that operation of the tape recorder can automatically be stopped when performance on one channel has been completed and the magnetic head can automatically be switched to the next channel when performance on one channel has been completed.

Still another object of the invention is to provide a device for changing over from one operation to another in a tape recorder of the multitrack endless tape type whereby switching from one to another of the operations of automatic stop and automatic channel changeover referred to hereinabove and the operation of repeat performance on the same channel can be effected selectively and readily.

Still another object is to provide a device for changing over from one operation to another in a tape recorder of the multitrack endless tape type whereby the operations referred to hereinabove can be performed selectively and readily by using a single switch for selectively effecting interconnections of parts of a circuit using a single operating power source.

Other objects and features of the invention will become apparent from the following description when considered in conjunction with the accompanying drawings, in which.

Figure 1:
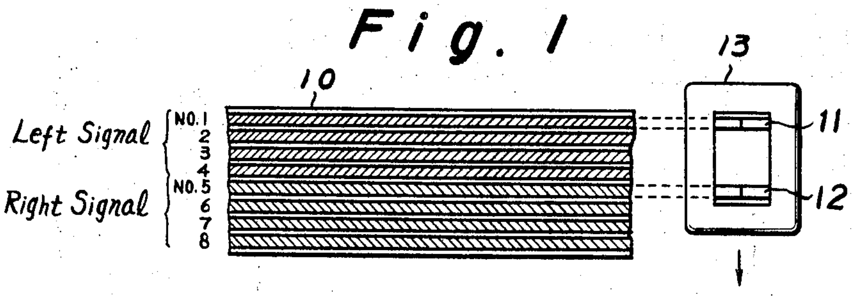
FIG. 1 is a view showing a track pattern of part of a multitrack endless tape in relation to a magnetic head.

FIG. 1 shows an eight track four channel stereophonic endless tape as an example of the multitrack endless tape in relation to a magnetic head. In the embodiment of the invention as shown, a tape 10 of one-fourth inch (6.35 millimeter) in width has formed thereon eight tracks, each 0.022 inch (0.56 millimeter) wide, spaced apart from one another a distance of 0.010 inch (0.25 millimeter). Of these eight tracks, No. 1 to No. 4 tracks contain left signals and No. 5 to No. 8 tracks contain right signals recorded thereon. By combining No. 1 track with No. 5 track, No. 2 track with No. 6 track, No. 3 track with No. 7 track and No. 4 track with No. 8 track, four channels of stereophonic signals are stored in the tape. In switching from one of these stereophonic channels to the next one in playback performance, a magnetic head 13 provided with a left signal magnetic head tip 11 and a right signal magnetic head tip 12 spaced apart from the former a distance corresponding to the width of four tracks on the tape is moved a distance corresponding to the width of one track by means of a magnetic head transfer mechanism subsequently to be described to thereby effect changeover of channels.

Figure 2:
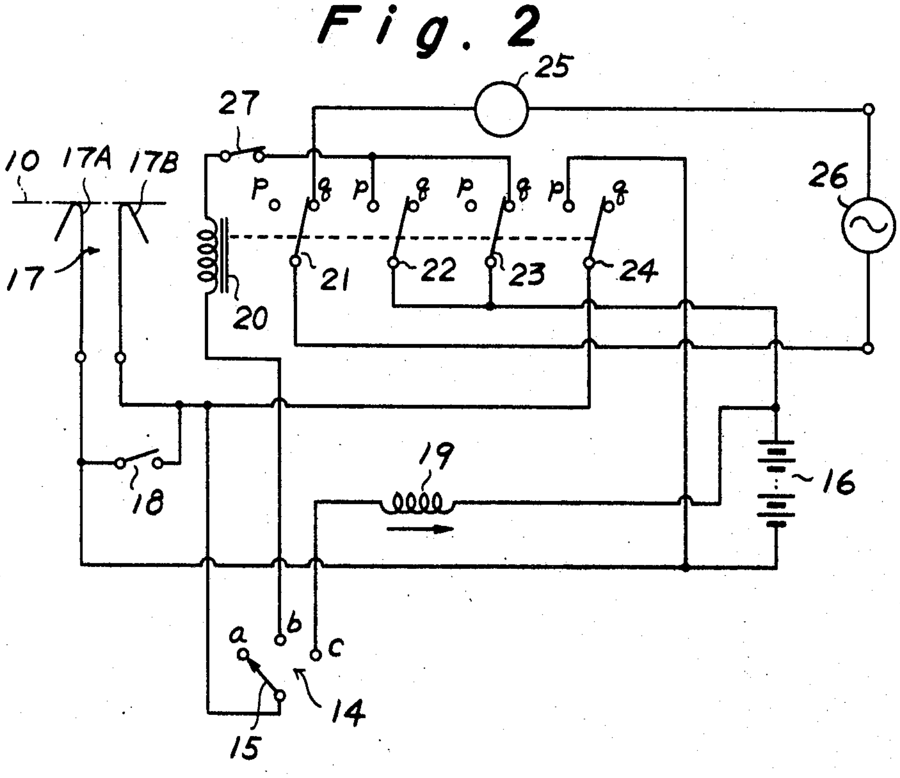
FIG. 2 is a connecting diagram of one embodiment of the device for changing over from one operation to another according to this invention.

One embodiment of the invention will now be explained with reference to the connecting diagram shown in FIG. 2. A switch 14 which includes s switch member 15 is arranged such that said member 15 can selectively be brought into engagement with a repeat performance contact *a*, automatic stop contact *b* and automatic channel changeover contact *c*. Power is supplied by a direct current power source 16.

A sensing contact 17 detects the position of a conducting foil (not shown) adhered to each channel record end position of the magnetic tape for indicating the point at which performance is completed. The sensing contact includes two contact members 17A and 17B, the contact member 17A being connected to the negative side of said direct current power source 16 and the contact member 17B being connected to said switch member 15. The spacing between the two contact members 17A and 17B is equal to or smaller than the length of said conducting foil. A manual switch 18 is disposed between said two contact members 17A and 17B. A plunger 19 is mounted between the positive side of said direct current power source 16 and the automatic channel changeover contact *c* of said switch 14. The construction of the plunger is subsequently to be described. A relay 20 has one end connected to the automatic stop contact *b* of said switch 14. Upon actuation of said relay 20, switches 21, 22, 23 and 24 coupled to the relay are simultaneously actuated each to be released from engagement with a contact *q* and brought into engagement with a contact *p*. A capstan motor 25 drives the magnetic tape which is disposed between an alternate current power source 26 for driving said motor and the contact *q* of the switch 21. A stop release switch 27 is mounted between the other end of said relay 20 and the contact *p* of switch 22 and the contact *q* of switch 23. The stop release switch 27 is coupled mechanically to the loading of the tape recorder with a tape cartridge (not shown) containing the magnetic tape 10 therein, whereby the switch is closed upon loading the tape recorder with the tape cartridge (not shown) containing the magnetic tape 10 therein, whereby the switch is closed upon loading the tape recorder with the tape cartridge. The switch 21 is connected to the direct current power source 26, and its contact *p* is a blank contact. The switches 22 and 23 are connected to the positive side of the direct current power source 16, the contact *q* of the switch 22 and the contact *p* of the switch 23 being blank contacts. The switch 24 is connected to the switch member 15 of the switch 14, its contact *p* being connected to the negative side of the direct current power source 16 and its contact *q* being a blank contact. The manner in which changingover of operations of the tape recorder is effected by means of the switch 14 in the circuit described hereinabove will be described hereunder:

I. Effecting Repeat Performance on the Same Channel

For this purpose, the switch member 15 of the switch 14 is brought into engagement with the blank contact *a*. Since the plunger 19 and relay 20 are open-circuited, they are not actuated even if a conducting foil on the magnetic tape is brought into engagement with the sensing contact 17 to electrically close the contact members 17A and 17B. Accordingly, the capstan motor 25 connected to the alternating current power source 26 through the contact *q* of switch 21 continues to operate whereby a recording on the same channel of the endless magnetic tape 10 can be played back repeatedly by means of the magnetic head 13.

II. Effecting Automatic Stop

For this purpose, the switch member 15 of the switch 14 is brought into engagement with the contact *b*. When a conducting foil adhered to the end of each channel on the magnetic tape 10 being played back is brought into engagement with the sensing contact 17 to electrically close the contact members 17A and 17B, a circuit is closed which connects the positive side of direct currrent power source 16, switch 23, stop release switch 27, relay 20, switch 14, contact members 17A and 17B of sensing contact 17 and negative side of direct current power source 16, whereby the relay 20 is actuated. Upon actuation of the relay 20, the switches 21, 22, 23 and 24 are each released from engagement with the contact *q* and brought into engagement with the contact *p*. This causes the switch 21 to open a circuit connecting the alternating current power source 26 to the capstan motor 25, whereby the capstan motor 25 stops operating. Accordingly, the magnetic tape 10 automatically stops its operation.

In this instance, even if the switch 23 is released from engagement with the contact *q* and brought into engagement with the contact *p*, the relay 20 continues to operate because it is connected to the direct current power source 16 through the switch 22 which is brought into engagement with the contact *p*. Alternatively, a fixed connection may be used instead of switches 22 and 23.

If, as aforementioned, a closed circuit is formed by closing the contact members 17A and 17B of the sensing contact 17 upon engagement of the latter with a conducting foil so as to actuate the relay 20 and bring the switch 24 into contact with the contact *p*, a circuit is closed which connects the positive side of the direct power source 16, switch 22, stop release switch 27, relay 20, switch 14, switch 24 and negative side of direct current power source 16, even if the conducting foil moves slightly after the power source circuit of the capstan motor 25 is opened and before the magnetic tape 10 is brought to a complete stop to thereby open the contact members 17A and 17B. Thus, the relay continues its operation, and consequently the capstan motor 25 still remains stopped in its operation, whereby the magnetic tape 10 remains stopped in its operation.

In causing the magnetic tape to operate again from said automatic stop condition to begin its performance, said tape cartridge is withdrawn from the tape recorder. This causes the stop release switch 27 to open, whereby the power source circuit of the relay 20 is opened to render the relay inoperative, with the result that the switches 21, 22, 23 and 24 each are released from engagement with the contact *p* and brought into engagement with the contact *q* to thereby cause the capstan motor 25 to start operating. The tape recorder is thus ready for beginning performance. If, therefore, the tape recorder is loaded with a tape cartridge, the cartridge begins to play back the recording again. Upon loading the tape recorder with the cartridge, said automatic stop switch 27 is automatically closed so as to be ready for next automatic stop operation.

If it is desired to manually stop operation at any point during performance without automatically stopping operation by means of a conducting foil at the end point of performance of a channel, the manual switch 18 is closed. This substantially closes the two contact members 17A and 17B of the sensing contact 17, so that the magnetic tape stops operating in the manner described hereinabove to thereby stop performance.

III. Effecting Automatic Changeover of Channels

Figure 3:
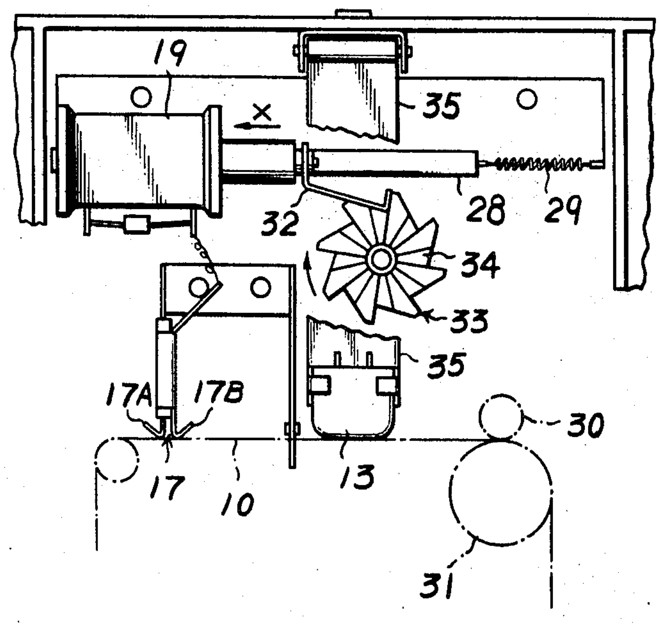
FIG. 3 is a plan view, with certain parts being cut out, of a magnetic head transfer mechanism of the prior art which is utilized in the device for changing over from one operation to another according to this invention.
Figure 4:
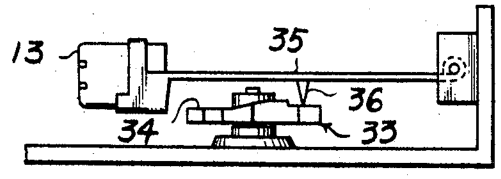
FIG. 4 is a side view of the mechanism shown in FIG. 3.

For this purpose, the switch member 15 of the switch 14 is brought into engagement with the contact *c*. If a conducting foil adhered to the end point of each channel on the magnetic tape being played back is brought into engagement with the sensing contact to electrically close the contact members 17A and 17B thereof, a circuit is closed which connects the positive side of direct current power source 16, plunger 19, switch 14, contact members 17B and 17A of sensing contact 17 and negative side of direct current power source 16, whereby said plunger 19 is actuated. Upon actuation of the plunger, an arm 28 shown in FIG. 3 moves in the direction of arrow X against the biasing force of a spring 29. Further movement of the magnetic tape 10 held between a capstan 30 on the capstan motor 25 and an idler 31 brings a conducting foil on said tape to pass by the sensing contact 17 to thereby open the contact members 17A and 17B thereof. This renders said plunger 19 inoperative, so that the arm 28 moves in the opposite direction of the arrow X under the influence of the biasing force of the spring 29. During this movement of the arm 28, a pawl 32 mounted on the arm allows a ratchet cam plate 33 to move by one stage. As shown in FIG. 4, said cam plate 33 is formed to provide on its upper surface 34 winding steps shaped like a spiral stairs, each step having a height corresponding to the amount of movement of the head tips 11 and 12 of the magnetic head 13 from one track to another on the tape. A projection 36 formed on the underside of an arm 35 for supporting the magnetic head 13 is positioned against the upper surface of the cam plate. It will be noted, therefore, that actuation of the plunger 19 causes the ratchet cam plate 33 to rotate, with the magnetic head 13 moving along the stairs on the upper surface 34 of the cam plate to automatically switch the magnetic tape from one channel to another. If the manual switch 18 is closed at any point as desired, the contact members 17A and 17B of the sensing contact 17 are substantially closed, with the result that changeover from one channel to another can be effected in the same manner as described hereinabove.

While the form of apparatus herein described constitutes a preferred embodiment of the invention it is to be understood that the invention is not limited to the precise form of apparatus, and that changes may be made therein without departing from the spirit and scope of the invention which is defined in the appended claims.

We claim:

1. An operation changing apparatus for tape recorders using multitrack endless tape and having a motor for driving the magnetic tape in contact with a magnetic head assembly, said apparatus comprising electric conducting portions on said tape in the proximity of each channel track end and constituting but a small fraction of tape length; an electric power circuit for driving said motor; normally closed first contact means inserted in the electric power circuit for controlling said power circuit; two conductor members mounted to contact the magnetic tape; a power source, one terminal of which is electrically connected to one of said two conductor members; normally open second contact means electrically connected between said two conductor members; relay means having a coil one terminal of which is electrically connected to the other terminal of said power source; said relay means upon energization simultaneously urging said normally closed contact means to open and said normally open contact means to close so that said electric power circuit is opened and said two conductor members short circuit each other; a plunger coil, one terminal of which is electrically connected to the other terminal of said power source; means responsive to the energization of said plunger coil for transferring the magnetic head assembly to an adjacent channel track; first means for electrically connecting the other conductor member to the other terminal of the relay coil so that the rotation of the motor is automatically stopped when said two conductor members contact and are short circuited by said electric conducting portions on the magnetic tape; second means for electrically connecting the other conductor member to the other terminal of the plunger coil so that the magnetic head assembly is automatically transferred to an adjacent channel track on the magnetic tape when said two conductor members simultaneously contact said electric conducting portions; third means for electrically connecting the other conductor member to a terminal having no connection so that the signal of only one channel track being scanned by the magnetic head assembly is repeatedly reproduced; and switch means for selecting one of the operations of said first means, said second means and said third means.

2. An operation changing apparatus for tape recorders using multitrack endless tape as defined in claim 1 further comprising a second normally opened switch electrically connected between said two conductor members and manually closed to short circuit said two conductor members.

3. An operation changing apparatus for tape recorders using multitrack endless tape and having a motor for driving the magnetic tape in contact with a magnetic head assembly to reproduce recorded signals, said apparatus comprising electric conducting portions on said tape in the proximity of each channel track end; an electric power circuit for driving said motor; normally closed first contact means in the electric power circuit; two conductor members mounted for contact with the magnetic tape; a power source, one terminal of which is electrically connected to one of said two conductor members; normally opened second contact means electrically connected between said two conductor members; relay means having a coil, one terminal of which is electrically connected to the other terminal of said power source; said relay means upon energizing simultaneously urging said normally closed contact means to open and said normally opened contact means to close so that said electric power circuit is opened and said two conductor members short circuit each other; a plunger coil, one terminal of which is electrically connected to the other terminal of said power source; means responsive to energization of said plunger coil for transferring the magnetic head assembly to an adjacent channel track; and a single pole, three position switch having a movable selector arm and first, second and third contacts, said movable selector arm being electrically connected to the other conductor member, said first contact having no connection, said second contact being electrically connected to the other terminal of said relay coil, said third contact being electrically connected to the other terminal of said plunger coil, so that during contact of said movable selector arm with said first contact, the signal of only one channel track being scanned by the magnetic head assembly is repeatedly reproduced, so that during contact of said movable selector arm with said second contact the rotation of the motor is automatically stopped by the energization of said relay coil when said two conductor members make contact with said electric conducting portions of the magnetic tape, so that during contact of said movable selector arm with said third contact the magnetic head assembly is automatically transferred to an adjacent channel track by the energization of said plunger coil when said two conductor members make contact with said electric conducting portions of the magnetic tape.